(12) United States Patent
Kaneko et al.

(10) Patent No.: US 9,858,103 B2
(45) Date of Patent: Jan. 2, 2018

(54) RESOURCE CONTROL APPARATUS, METHOD, AND STORAGE MEDIUM

(71) Applicant: KABUSHIKI KAISHA TOSHIBA, Tokyo (JP)

(72) Inventors: Yu Kaneko, Kanagawa (JP); Toshio Ito, Kanagawa (JP); Tomonori Maegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 14/845,418

(22) Filed: Sep. 4, 2015

(65) Prior Publication Data
US 2016/0179562 A1   Jun. 23, 2016

(30) Foreign Application Priority Data

Dec. 19, 2014   (JP) .................................. 2014-256854

(51) Int. Cl.
*G06F 9/455* (2006.01)

(52) U.S. Cl.
CPC .................... *G06F 9/45558* (2013.01); *G06F 2009/45591* (2013.01)

(58) Field of Classification Search
None
See application file for complete search history.

(56) References Cited

U.S. PATENT DOCUMENTS

| 8,634,296 B2* | 1/2014 | Agarwal | ............ H04B 7/18515 370/230 |
| 9,471,385 B1* | 10/2016 | Khafizov | .............. G06F 9/5038 |
| 9,735,984 B2* | 8/2017 | Crowell | .............. H04L 12/6418 |
| 2002/0013802 A1* | 1/2002 | Mori | ...................... G06F 9/5016 718/1 |
| 2005/0055694 A1* | 3/2005 | Lee | ........................ G06F 9/5083 718/100 |
| 2008/0028411 A1* | 1/2008 | Cherkasova | .......... G06F 9/5027 718/104 |
| 2008/0295096 A1* | 11/2008 | Beaty | .................... G06F 9/4856 718/1 |

(Continued)

FOREIGN PATENT DOCUMENTS

| JP | 2011-170787 | 9/2011 |
| JP | 2016-091109 | 5/2016 |

OTHER PUBLICATIONS

Gong et al., "PRESS: Predictive Elastic ReSource Scaling for cloud systems", *Dept. of Computer Science, North Carolina State University*, 2010, 8 pages.

*Primary Examiner* — Hiren Patel
(74) *Attorney, Agent, or Firm* — Nixon & Vanderhye, P.C.

(57) ABSTRACT

The resource control apparatus according to an embodiment described herein includes an allocating time acquisitor, a usage amount meter, an allocation amount calculator, and an allocation amount setter. The allocating time acquisitor acquires an allocating time at which the VMM allocates a resource allocation amount to a VM. The usage amount meter measures a resource usage amount of the VMM at the allocating time. The allocation amount calculator calculates an allocation amount based on a usage amount. The allocation amount setter sets an allocation amount to a VMM at a setting time which is a predetermined time before an allocating time.

10 Claims, 7 Drawing Sheets

(56) References Cited

U.S. PATENT DOCUMENTS

| | | | |
|---|---|---|---|
| 2009/0187776 A1* | 7/2009 | Baba | G06F 1/3203 713/320 |
| 2010/0131959 A1* | 5/2010 | Spiers | G06F 9/50 718/105 |
| 2010/0175070 A1* | 7/2010 | Baba | G06F 9/505 718/105 |
| 2012/0023493 A1* | 1/2012 | Mori | G06F 9/45558 718/1 |
| 2012/0198447 A1* | 8/2012 | Osogami | G06F 9/5066 718/1 |
| 2012/0233613 A1* | 9/2012 | Shimogawa | G06F 9/45558 718/1 |
| 2014/0007097 A1* | 1/2014 | Chin | G06F 9/45533 718/1 |
| 2014/0053153 A1* | 2/2014 | Kozakai | G06F 9/45533 718/1 |
| 2014/0089917 A1* | 3/2014 | Attalla | G06F 9/455 718/1 |
| 2014/0137110 A1* | 5/2014 | Engle | G06F 9/5022 718/1 |
| 2014/0245297 A1* | 8/2014 | Hackett | G06F 9/5077 718/1 |
| 2014/0281330 A1* | 9/2014 | Baldwin | G06F 12/023 711/170 |
| 2014/0282503 A1* | 9/2014 | Gmach | H04L 41/0823 718/1 |
| 2015/0007178 A1* | 1/2015 | Kaneko | G06F 9/5088 718/1 |
| 2016/0103717 A1* | 4/2016 | Dettori | G06F 9/45558 719/318 |
| 2016/0124765 A1* | 5/2016 | Kaneko | G06F 9/45558 718/1 |
| 2016/0253215 A1* | 9/2016 | Fang | H04L 67/1008 718/104 |
| 2016/0261519 A1* | 9/2016 | Testa | H04L 43/026 |

* cited by examiner

RESOURCE CONTROL APPARATUS, METHOD, AND STORAGE MEDIUM

CROSS REFERENCE TO RELATED APPLICATION(S)

This application is based upon and claims the benefit of priority from the prior Japanese Patent Application No. 2014-256854, filed on Dec. 19, 2014, the entire contents of which are incorporated herein by reference.

FIELD

Embodiments described herein relate generally to a resource control apparatus, method, and storage medium.

BACKGROUND

A software technique called a virtual machine monitor (hereinafter called a VMM) such as a Hypervisor is used to run multiple virtual machines (hereinafter called a VM) on one computer The VMM has a function to allocate a resource to each VM, such as that 1 GB memory is allocated to a VM 1, and 2 GB memory is allocated to a VM 2. Further, the VMM can dynamically (i.e. without stopping the VM) change a resource to be allocated to each VM.

A resource needed by a VM can be allocated to the VM by using this function of VMM. The resource needed by a VM fluctuates depending on time. A computer's resource can be effectively used by allocating the resource in accordance with the fluctuation of the resource needed by a VM. This technique is called a dynamic resource allocation technique.

In the dynamic resource allocation technique, it is important to assure a resource needed by a VM. Resource assurance means that more amount of a resource is allocated than the amount needed by a VM. If the resource is not assured, operation of a VM might be disturbed.

DETAILED DESCRIPTION

Embodiments will now be explained with reference to the accompanying drawings. The present invention is not limited to the embodiments.

The resource control apparatus according to an embodiment described herein includes an allocating time acquisitor, a usage amount meter, an allocation amount calculator, and an allocation amount setter. The allocating time acquisitor acquires an allocating time at which the VMM allocates a resource allocation amount to a VM. The usage amount meter measures a resource usage amount of the VMM at the allocating time. The allocation amount calculator calculates an allocation amount based on a usage amount. The allocation amount setter sets an allocation amount to a VMM at a setting time which is a predetermined time before an allocating time.

First Embodiment

A resource control apparatus, method, and program according to a first embodiment will be described with reference to FIGS. 1 to 8. A resource control apparatus according to the embodiment calculates a resource allocation amount to be allocated to a VM by a VMM and sets the calculated allocation amount to the VMM. The VMM allocates the set allocation amount to the VM. The resource herein means a resource in a physical machine (hereinafter called a PM) in which a VM operates. Examples of a resource to be allocated to a VM by a VMM include, but are not limited to, a CPU, a memory, a storage, and a network in a PM.

In the embodiment, a VMM allocates a resource to a VM at a predetermined time interval. In addition, a predetermined time interval is already known. Hereinafter, an allocating time means a time at which a VMM allocates a resource to a VM, and an allocation interval means an interval of each allocating time.

Figure 1:
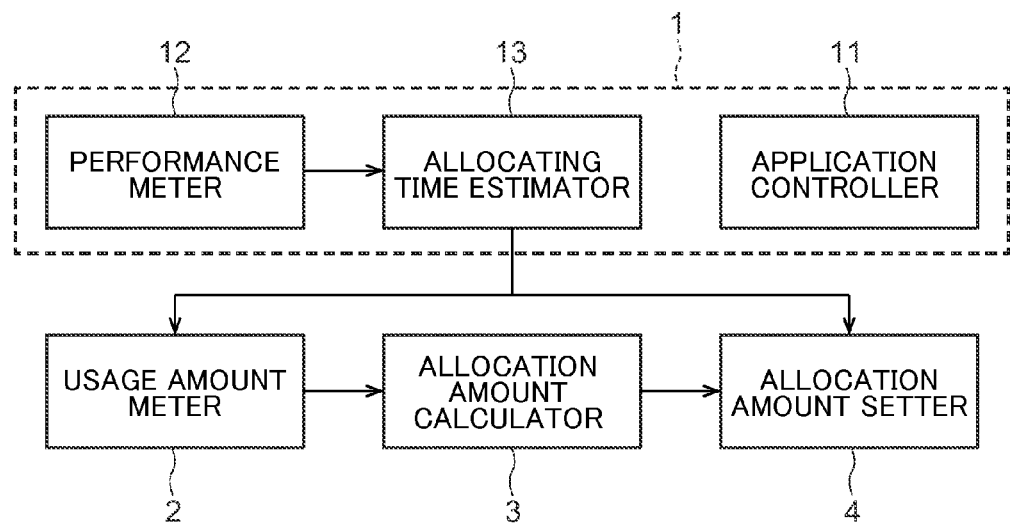
FIG. 1 is a diagram illustrating a function configuration of a resource control apparatus according to a first embodiment.

First, a function configuration of the resource control apparatus according to the embodiment will be described with reference to FIGS. 1 to 4. FIG. 1 is a diagram illustrating a function configuration of the resource control apparatus according to the embodiment. As illustrated in FIG. 1, the resource control apparatus includes an allocating time acquisitor 1, a usage amount meter 2, an allocation amount calculator 3, and an allocation amount setter 4.

The allocating time acquisitor 1 acquires an allocating time. As described above, since a VMM allocates a resource to a VM at a predetermined allocation interval, the allocating time acquisitor 1 can calculate subsequent allocating times if the allocating time acquisitor 1 acquires one allocating time.

Figure 2:
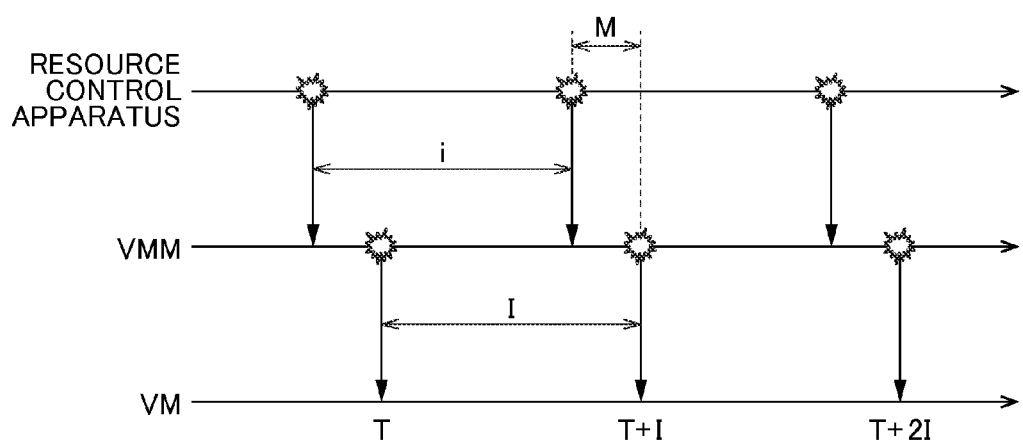
FIG. 2 is a diagram describing an operation of a resource control apparatus.

Herein, FIG. 2 is a diagram for describing operation of the resource control apparatus according to the embodiment. When an allocating time acquired by the allocating time acquisitor 1 is indicated by T and an allocation interval is indicated by I, an allocating time after the allocating time T is indicated by T+I×N (N is an integer of 1 or more) as illustrated in FIG. 2. The allocating time acquisitor 1 will be described in detail later.

The usage amount meter 2 measures a resource usage amount used by a VM at a predetermined time interval. More specifically, the usage amount meter 2 measures a resource usage amount from a previous allocating time T+I×(N−1) to an allocating time T+I×N at the allocating time T+I×N calculated by the allocating time acquisitor 1. For example, the usage amount meter 2 measures a resource usage amount from a time T to a time T+I at the time T+I. Therefore, a time for measuring a usage amount by the usage amount meter 2 coincides with a resource allocating time by a VMM.

A method for measuring a usage amount by the usage amount meter 2 is arbitrary. The usage amount meter 2 can, for example, acquire history data of a resource used by a VM from a VMM and a VM and measure a resource usage amount based on the acquired history data.

The allocation amount calculator 3 calculates a resource allocation amount to be allocated to a VM by a VMM based on a resource usage amount between each allocating time, which has been measured by the usage amount meter 2. A method for calculating the allocation amount can be arbitrarily selected from known methods for calculating an allocation amount based on the calculated resource usage amount. For example, the allocation amount calculator 3 can calculate a prediction value C of a resource usage amount at an allocating time from a moving average of usage amounts which have been calculated at each allocating time in the past and calculate an allocation amount based on the prediction value C. The allocation amount calculator 3 calculates, as an allocation amount, the prediction value C and a value adding a predetermined margin to the prediction value C.

The allocation amount setter 4 sets the resource allocation amount, calculated by the allocation amount calculator 3, to a VMM at a predetermine time interval. More specifically, the allocation amount setter 4 sets an allocation amount at a setting time that is a predetermined time before the allocating time calculated by the allocating time acquisitor 1. Therefore, the setting time is expressed as T+I×N−M (M<I), and an interval of the setting time (setting interval i) coincides with an allocation interval I (i=I) as illustrated in FIG. 2. The above-described M is a margin depending on a time required from setting an allocation amount by the allocation amount setter 4 until actually allocating the allocation amount by a VMM. For example, a VMM allocates an allocation amount, which has been set by the allocation amount setter 4 at a time T+I−M, to a VM at the time T+I.

Herein, the allocating time acquisitor 1 will be described in detail. As illustrated in FIG. 1, in the embodiment, the allocating time acquisitor 1 includes an application controller 11, a performance meter 12, and an allocating time estimator 13.

The application controller 11 controls starting and stopping operation of an application which runs on a VM. An application controlled by the application controller 11 is arbitrary software run on a VM. The application may be a special application installed in a VM to acquire an allocating time and may be an existing application installed in a VM in advance (for example, a control application for providing a service to a customer). The application controller 11 can control an application by using such as a function of a VMM, Secure Shell, and TCP/IP.

This application is preferably capable of performing a process for exhibiting substantially constant performance with time. A reason thereof will be described later. In addition, in the case where this application operates without an instruction by the application controller 11, the resource control apparatus may not include the application controller 11. Examples of such a case include a case where an application is constantly operating on a VM and a case where a VM user controls start and stop of the operation of an application.

The performance meter 12 measures performance of the above-described application which operates on a VM at a time interval shorter than an allocation interval. Examples of the performance measured by the performance meter 12 include, but are not limited to, a communication amount, a disk access amount, a computing frequency, and a communication frequency per unit time of an application, and a response speed of an application. The performance meter 12 can measure performance by acquiring and analyzing a log file indicating operation history and the application performance from a VM and the application.

Figure 3:
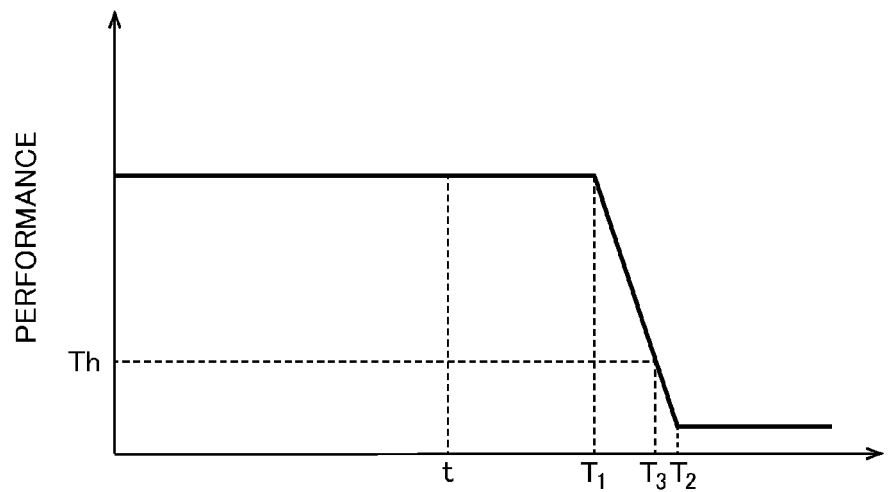
FIG. 3 is a graph illustrating changes in application performance.

The allocating time estimator 13 estimates an allocating time based on changes in the application performance measured by the performance meter 12. Application performance which operates on a VM changes depending on a resource allocation amount allocated to the VM. Therefore, when a small allocation amount is set to a VMM at the arbitrary time t by the allocation amount setter 4, a small allocation amount is allocated to a VM at an allocating time subsequent to the time t, and application performance is lowered, as illustrated in FIG. 3. After causing the allocation amount setter 4 to set a large allocation amount and then to set a small allocation amount, the allocating time estimator 13 may estimate, as the allocating time T, a time $T_1$ at which performance has started to degrade, a time $T_2$ at which the performance degradation has finished, or a time $T_3$ at which the performance has become less than a predetermined threshold Th. In addition, the allocating time estimator 13 may estimate a time which is a predetermined time $T_a$ before the times $T_1$ to $T_3$ as the allocating time T. Examples of the $T_a$ include a measuring interval by the performance meter 12 and a predetermined value such as 1 millisecond.

Figure 4:
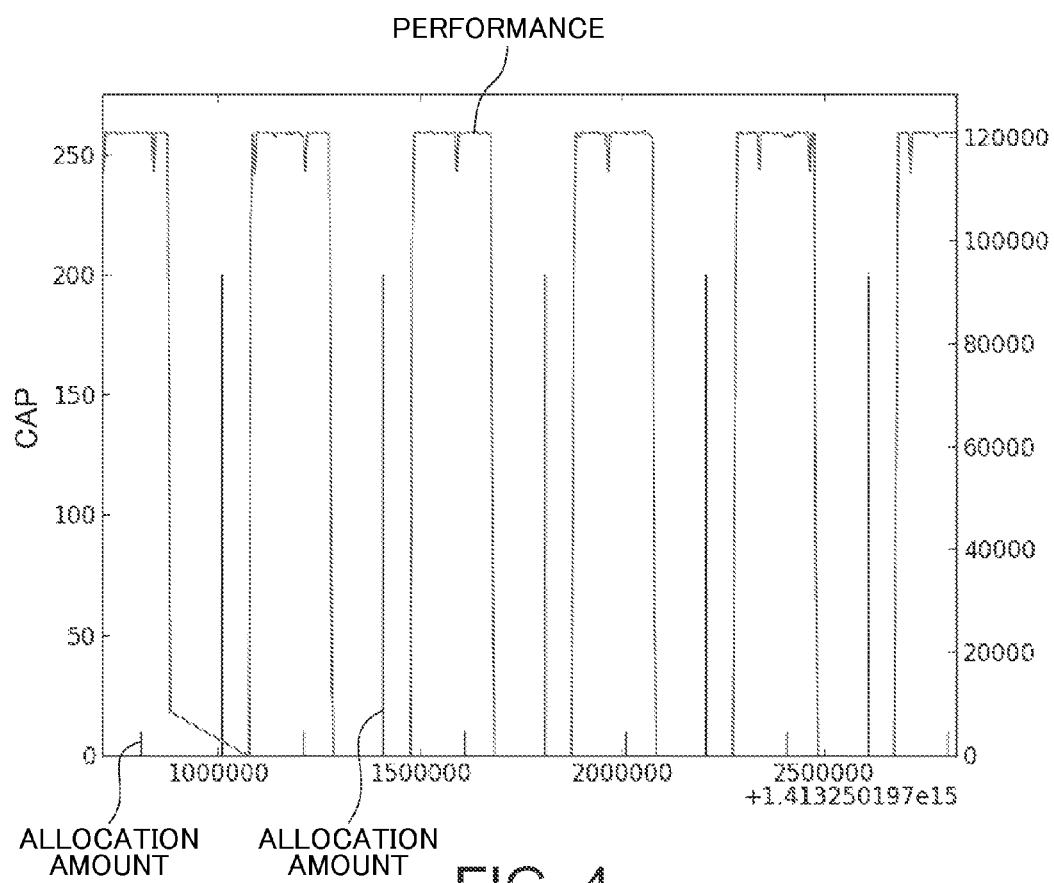
FIG. 4 is a graph illustrating an experimental result of the changes in application performance.

Herein, FIG. 4 is a graph indicating an experimental result of a change in application performance in the case where a resource allocation amount is increased or decreased. In FIG. 4, a left vertical axis indicates an allocation amount, a right vertical axis indicates performance, and a horizontal axis indicates a time. FIG. 4 indicates an allocation amount set at each time and application performance measured at each time. According to FIG. 4, performance is drastically degraded after a small allocation amount is set and drastically improved after a large allocation amount is set.

The allocating time estimator 13 estimates an allocating time based on changes in application performance as described above. As illustrated in FIG. 3, the changes in application performance can be easily observed in the case where the application performance is substantially constant. Therefore, when an allocating time is estimated, an application is preferably capable of performing a process for exhibiting substantially constant performance with time so that the application performance becomes substantially constant. Thus, the allocating time estimator 13 can precisely estimate an allocating time.

Further, when an allocating time is estimated, an allocation amount is preferably significantly changed so that performance change can be easily observed. For example, after 80 to 100% of a resource is allocated to a VM, the allocation amount is preferably reduced to 0 to 20%. Since the application performance drastically changes in this manner, performance change can be easily observed. Therefore, the allocating time estimator 13 can precisely estimate an allocating time.

Although the case of decreasing an allocation amount has been described in the above description, an allocating time can be estimated in the same way in the case of increasing the allocation amount. In this case, the allocating time estimator 13 may estimate, as the allocating time T, the time $T_1$ at which performance has started to improve, the time $T_2$ at which the performance improvement has finished, the time $T_3$ at which the performance has become less than the predetermined threshold Th, or a time which is a predetermined time $T_a$ before the times $T_1$ to $T_3$.

Figure 5:
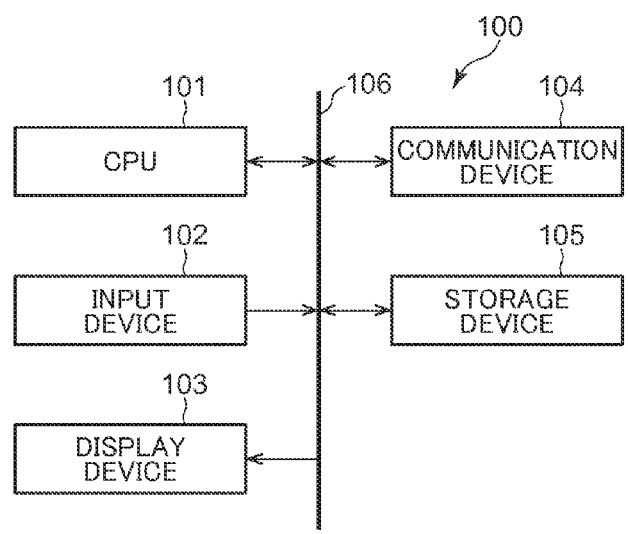
FIG. 5 is a diagram illustrating a hardware configuration of the resource control apparatus illustrated in FIG. 1.

Next, a hardware configuration of the resource control apparatus according to the embodiment will be described with reference to FIGS. 5 and 6. The resource control apparatus according to the embodiment is configured by a computer 100 (PM) as illustrated in FIG. 5. The computer 100 includes a central processing unit (CPU) 101, an input device 102, a display device 103, a communication device 104, and a storage device 105, and these devices are connected each other by a bus 106.

The CPU 101 is a control unit and a computing unit of the computer 100. The CPU 101 performs computing processing based on data and a program input from each device (for example, the input device 102, the communication device 104, and the storage device 105) connected via the bus 106, and outputs a computing result and a control signal to each device (for example, the display device 103, the communication device 104, and the storage device 105) connected via the bus 106.

Specifically, the CPU 101 executes an operating system (OS) of the computer 100 and a resource control program and controls each device included in the computer 100. The resource control program is a program to cause the computer 100 to realize the above-described each function configuration of a resource control apparatus. The computer 100 functions as the resource control apparatus when the CPU 101 executes the resource control program.

The input device 102 is a device configured to input information to the computer 100. Examples of the input device 102 include, but are not limited to, a keyboard, a mouse, and a touch panel.

The display device 103 is a device configured to display a picture and an image. Examples of the display device 103 include, but are not limited to, a liquid crystal display (LCD), a cathode-ray tube (CRT), and a plasma display panel (PDP).

The communication device 104 is a device by which the computer 100 communicates with an external device by a wireless or wired channel. Examples of the communication device 104 include, but are not limited to, a modem, a hub, and a router.

The storage device 105 is a storage medium for storing an OS of the computer 100, a resource control program, data necessary for executing the resource control program, and data generated by executing the resource control program. The storage device 105 includes a main storage and an external storage. Examples of the main storage include, but are not limited to, RAM, DRAM, and SRAM. Examples of the external storage include, but are not limited to, a hard disk, an optical disk, flash memory, and a magnetic tape.

The computer 100 may include one or a plurality of the CPU 101, the input device 102, the display device 103, the communication device 104, and the storage device 105 and may be connected to peripherals such as a printer and a scanner.

In addition, the resource control apparatus may be configured by a single computer 100 and may be configured as a system including multiple computers 100 connected each other.

Further, a resource control program may be stored in the storage device 105 of the computer 100 in advance, may be stored in a storage medium such as a CD-ROM, and may be uploaded on the Internet. In any case, the resource control apparatus can be configured by installing the resource control program in the computer 100 and executing the program.

Figure 6:
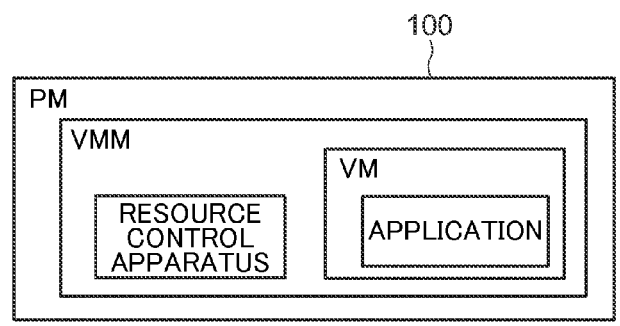
FIG. 6 is diagrams illustrating a relation between the resource control apparatus illustrated in FIG. 1 and a VM.
Figure 6:
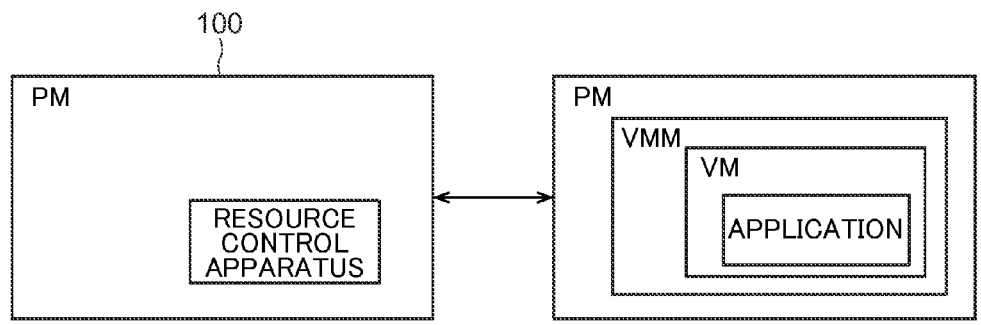

Furthermore, as illustrated in FIG. 6, the resource control apparatus may be included in the computer 100 including a PM in which a VM and a VMM operate and may be included in another computer 100 which is separate from the PM in which a VM and a VMM operate. In this case, the resource control apparatus can communicate with the PM, in which a VM and a VMM operate, via the communication device 104 of the computer 100.

Figure 7:
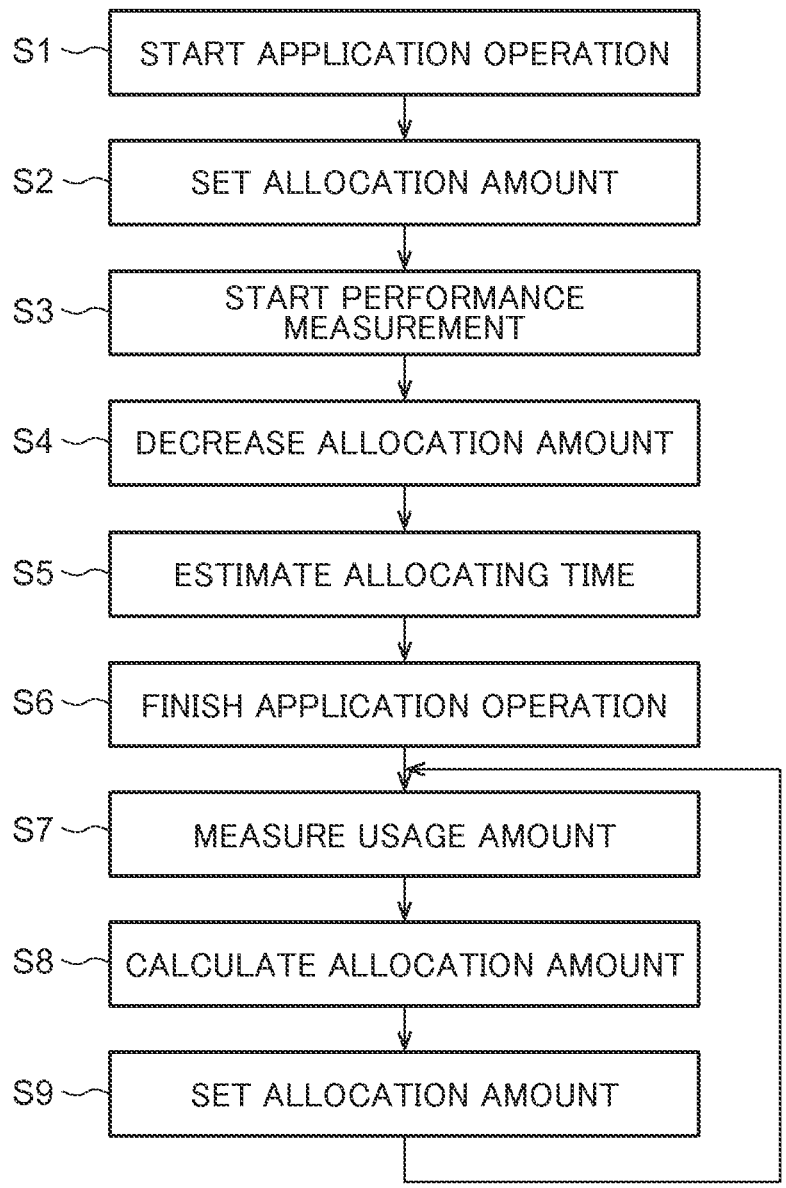
FIG. 7 is a flowchart describing processing of a resource control apparatus illustrated in FIG. 1.

Next, a resource control method according to the embodiment will be specifically described with reference to FIG. 7. FIG. 7 is a flowchart illustrating an example of processing by the resource control apparatus according to the embodiment.

Hereinafter, a resource is assumed to be a CPU, and application performance is assumed to be a computing frequency of the CPU. In addition, the application is assumed to output a log file including a time and a computing frequency of the CPU per predetermined time (for example, per 1 millisecond).

In step S1, the application controller 11 starts operation of an application on a VM. In the case where an application is already operating when the process starts, step S1 is omitted.

In step S2, the allocation amount setter 4 sets 100% of the allocation amount of a CPU to a VMM. The allocation amount allocated herein is an allocation amount for estimating an allocating time from performance change, and can be set in advance. The allocation amount is, for example, set to an arbitrary value over 80%. Then, the set allocation amount will be allocated to a VM by a VMM.

In step S3, the performance meter 12 starts measuring application performance. The performance meter 12 refers to a log file output by an application to calculate a computing frequency per unit time when starting measuring the performance. The computing frequency of a CPU included in the log file is an accumulated value. Therefore the performance meter 12 calculates a computing frequency per unit time by subtracting a computing frequency of a log file before the unit time from a computing frequency in the log file as at a measuring time. Thus, performance history data as illustrated in FIG. 4 can be generated. A method for acquiring a log file is arbitrary. The log file may be acquired from a VMM and may be acquired via the Internet by file transfer with FTP and HTTP.

In step S4, the allocation amount setter 4 sets 10% of the allocation amount of a CPU to a VMM. The allocation amount allocated herein is an allocation amount for estimating an allocating time from performance change, and can be set in advance. The allocation amount can be set to, for example, an arbitrary value less than 20%. Then, the set allocation amount will be allocated to a VM by a VMM.

In step S5, the allocating time estimator 13 estimates the allocating time T. In step S4, application performance is drastically degraded as illustrated in FIG. 4 since the allocation amount of a CPU has been decreased from 100 to 10%. The allocating time estimator 13 can estimate the allocating time T by referring to the performance history data generated by the performance meter 12. A method for estimating an allocating time is as described above.

In step S6, the application controller 11 finishes operation of an application on a VM. In the case where the application may be already operating when the process finishes, step S6 is omitted.

In step S7, the usage amount meter 2 measures the usage amount of CPU by a VM. The usage amount is measured at an allocating time $T+I \times N$ of the allocating time T, which has been calculated based on the allocating time T estimated by the allocating time estimator 13. The usage amount meter 2 measures the CPU usage amount from the time $T+I \times (N-1)$ to the time $T+I \times N$ at the allocating time $T+I \times N$.

In step S8, the allocation amount calculator 3 calculates the allocation amount of a CPU. The allocation amount calculated herein is an allocation amount allocated to VM by a VMM at the allocating time $T+I \times (N+1)$. A method for calculating the allocation amount is as described above.

In step S9, the allocation amount setter 4 sets the CPU allocation amount calculated by the allocation amount calculator 3 to a VMM. The allocation amount is set at a setting time $T+I \times (N+1)-M$. Then, the VMM allocates the set allocation amount to the VM at the allocating time $T+I \times (N+1)$.

Hereafter, steps S7 to S9 are repeated until the process is finished. In the above description, the allocating time has been estimated once in step S1. However, it may be estimated multiple times. The allocating time can be repeatedly estimated, for example, at a predetermined interval or an arbitrary timing (for example, at a timing failed in resource assurance). Thus, assurance accuracy of an allocating time can be improved.

Figure 8:
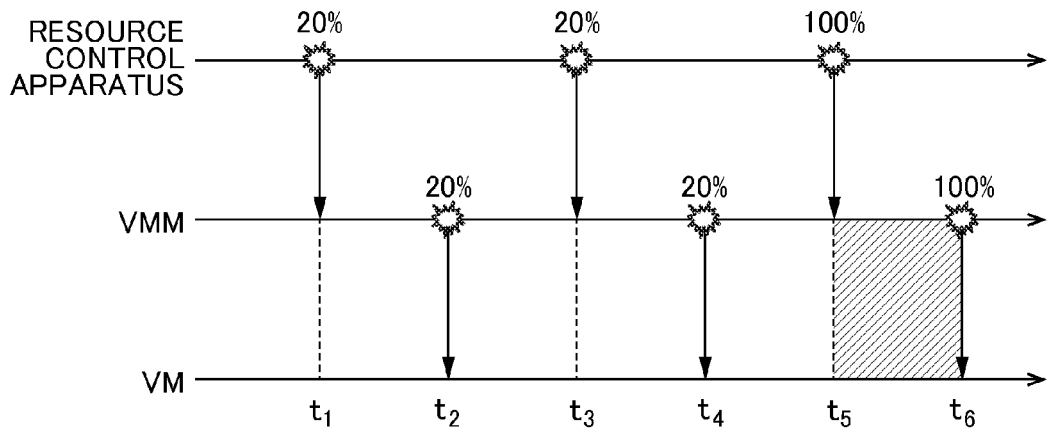
FIG. 8 is a diagram describing operation of a conventional resource control apparatus.

As a conventional resource control apparatus, an apparatus is proposed which allocates a resource for each time slot having a constant time width. Herein, FIG. 8 is a diagram describing a conventional resource control method. In a conventional method, a resource usage amount is calculated and an allocation amount is set at boundary time $t_1$, $t_3$, and $t_5$ between each time slot.

In general, since a VMM allocates a resource at a constant allocation interval I regardless of operation of a resource control apparatus, an allocating time becomes times $t_2$, $t_4$, and $t_6$ that are later than a setting time. The allocation interval I of a VMM is generally several to several tens milliseconds. Therefore, a time lag between an allocating time and a setting time becomes several to several tens milliseconds.

In a conventional method, it is assumed that an application, in which operation accuracy is several minutes to several hours, operates on a VM. Therefore, the above-described time lag between the allocating time and the setting time is not been considered since it does not significantly affect resource assurance.

However, in the case where an application, in which operation accuracy is several to several tens milliseconds, operates on a VM, a resource might be in short in a time slot in which a resource usage amount is dramatically increased. For example, in the case of FIG. 8, a resource might be in short at the setting time $t_5$ to the allocating time $t_6$ (a hatched portion). This is because a resource control apparatus calculates 100% of the allocation amount needed after the setting time $t_5$ and sets 100% of the allocation amount to the setting time $t_5$. The allocation amount 100% cannot be actually allocated by the allocating time $t_6$. Therefore, in the case where a VM needs a large amount of a resource at the times $t_5$ to $t_6$, the resource is in short at the times $t_5$ to $t_6$.

On the other hand, the resource control apparatus according to the embodiment can calculate an allocation amount based on a resource usage amount measured at an allocating time and set that the calculated allocation amount is allocated to a subsequent allocating time. Specifically, the resource control apparatus according to the embodiment calculates 100% of the allocation amount needed after the allocating time $t_6$ and sets the allocation amount 100% to the setting time $t_6-M$. Thus, the allocation amount 100% is allocated to the allocating time $t_6$, and resource shortage can be suppressed.

As described above, the resource control apparatus according to the embodiment can precisely assure a resource of a VM in the case where an application, in which operation accuracy is several to several tens milliseconds, operates on the VM. The resource control apparatus, for example, can be preferably used for resource control of a control application which operates on a VM of a cloud server.

Second Embodiment

Figure 9:
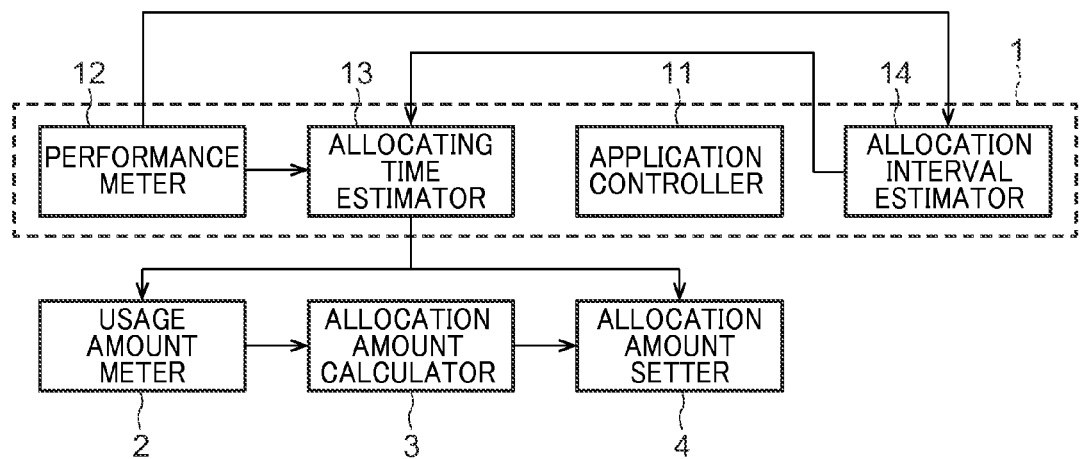
FIG. 9 a diagram illustrating a function configuration of a resource control apparatus according to a second embodiment.
Figure 10:
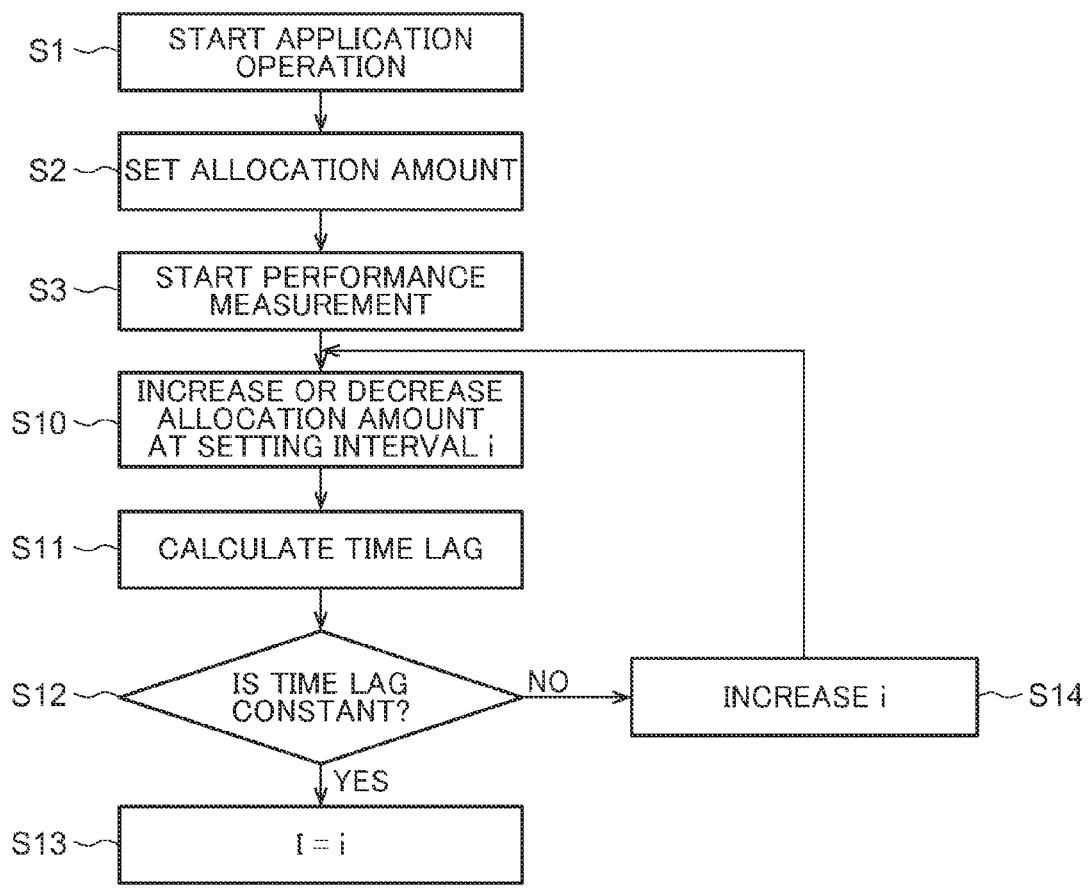
FIG. 10 is a flowchart illustrating a process to estimate an allocation interval by the resource control apparatus illustrated in FIG. 9.

A resource control apparatus, method, and program according to a second embodiment will be described with reference to FIGS. 9 and 10. In the first embodiment, it has been assumed that the allocation interval I has been already known. However, a case where the allocation interval I is not clear can be considered. Therefore, the resource control apparatus according to the embodiment assumes the allocation interval I.

First, a function configuration of the resource control apparatus according to the embodiment will be described with reference to FIG. 9. FIG. 9 a diagram illustrating a function configuration of the resource control apparatus according to the embodiment. As illustrated in FIG. 9, an allocating time acquisitor 1 of the resource control apparatus further includes an allocation interval estimator 14. Other configuration is similar to those in the first embodiment. Hereinafter, the allocation interval estimator 14 will be described.

The allocation interval estimator 14 estimates the allocation interval I. In the embodiment, the allocating time estimator 13 calculates an allocating time $T+I \times N$ based on the allocation interval I estimated by the allocation interval estimator 14.

In the case where a setting interval i of an allocation amount by an allocation amount setter 4 and an allocation interval I of an allocation amount by a VM are equal, a time from a setting time of the allocation amount until application performance changes become constant. The allocation interval estimator 14 estimates the allocation interval I based on performance changes in response to periodic changes in an allocation amount by using the above characteristic.

Specifically, the allocation interval estimator 14 causes the allocation amount setter 4 to alternately set a large allocation amount and a small allocation amount at predetermined setting intervals i as illustrated in FIG. 4. The allocation interval estimator 14 compares a setting time of an allocation amount and a time at which performance changes in response to changes in the allocation amount.

The allocation interval estimator 14 compares multiple setting intervals i in this manner and searches the setting intervals i so that a time from a setting time of an allocation amount until performance changes becomes constant. The allocation interval estimator 14 estimates the searched setting interval i as the allocation interval I.

Next, a method for estimating the allocation interval I according to the embodiment will be described with reference to FIG. 10. FIG. 10 is a flowchart illustrating a process to estimate the allocation interval I by the resource control apparatus according to the embodiment. Steps S1 to S3 illustrated in FIG. 10 are similar to those in the first embodiment. In the embodiment, after a performance meter 12 has started measuring application performance in step S3, the process proceeds to step S10.

In step S10, the allocation amount setter 4 increases and decreases the allocation amount of a CPU at a predetermined setting interval i. Specifically, a large allocation amount (for example, 100%) and a small allocation amount (for example, 10%) are alternatively set to a VMM.

An initial value of the setting interval i is preferably smaller than the allocation interval I and, for example, is an arbitrary value that is 10 micro milliseconds to 1 millisecond. This is because the setting interval i might be two or more integer times (for example, i=2×I) of the allocation interval I in the case of searching from an initial value which is larger than the allocation interval I. In the case where the setting interval i is two or more integer times of the allocation interval I, the setting interval i is incorrectly estimated as the allocation interval I since a time from a setting time until performance changes becomes constant even though the setting interval i and the allocation interval I do not coincide.

However, by searching from the initial value smaller than the allocation interval I, it can be prevented that the setting interval i becomes two or more integer times of the allocation interval I. Therefore, incorrect estimation of the allocation interval I is prevented, and estimation accuracy of the allocation interval I can be improved.

In step S11, the allocation interval estimator 14 calculates a time lag between a setting time and a time at which performance has changed by referring to performance history data generated by the performance meter 12. As a time at which performance has changed, for example, the time $T_1$ at which performance change has started, the time $T_2$ at which the performance change has finished, or the time $T_3$ at which performance has become more or less than a predetermined threshold Th can be used.

The allocation interval estimator 14 continues processes in steps S10 and S11 for a predetermined time V and calculates a popularity of the above-described time lag. The predetermined time V can be arbitrarily set and is, for example, approximately 10 times of the setting interval i.

After the predetermined time V has passed, the allocation interval estimator 14 determines whether the calculated multiple time lags are constant. The allocation interval estimator 14 determines that the time lags are constant, for example, in the case where dispersion of multiple time lags, a standard deviation, or a difference between a maximum value and a minimum value is less than a predetermined value.

In the case where it has been determined that the time lags have been constant (YES in step S12), the process proceeds to step S13.

In step S13, the allocation interval estimator 14 estimates the setting interval i as the allocation interval I (I=i). By using the allocation interval I estimated in this manner, the allocating time estimator 13 can estimate an allocating time.

On the other hand, in the case where it has been determined that the time lags have not been constant (NO in step S12), the process proceeds to step S14.

In step S14, the allocation interval estimator 14 increases the setting interval i. An increase amount of the setting interval i is preferably smaller than the allocation interval I and, for example, is an arbitrary value that is 10 micro milliseconds to 1 millisecond. Then, the process is returned to step S10. The allocation amount setter 4 increases or decreases the allocation amount of a CPU at a new setting interval i.

As described above, the resource control apparatus according to the embodiment can estimate the allocation interval I of a VMM based on changes in application performance. Thus, even in the case where the allocation interval I of a VMM is not clear, resource assurance accuracy can be improved by estimating an allocating time.

Third Embodiment

Figure 11:
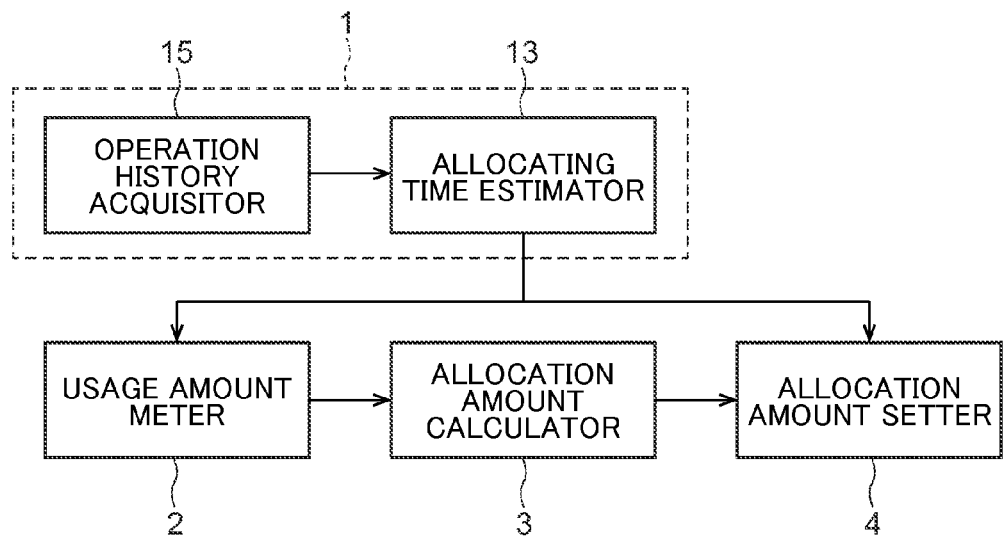
FIG. 11 a diagram illustrating a function configuration of a resource control apparatus according to a third embodiment.

A resource control apparatus, method, and program according to a third embodiment will be described with reference to FIG. 11. The resource control apparatus according to the embodiment estimates an allocating time of a VMM based on operation history of the VMM.

A function configuration of the resource control apparatus according to the embodiment will be described with reference to FIG. 11. FIG. 11 a diagram illustrating a function configuration of the resource control apparatus according to the embodiment. As illustrated in FIG. 11, an allocating time acquisitor 1 of the resource control apparatus includes an allocating time estimator 13 and an operation history acquisitor 15. Other configuration is similar to those in the first embodiment. Hereinafter, the allocating time acquisitor 1 will be described.

The operation history acquisitor 15 acquires an operation history log file of a VMM. The log file includes an operation (processing) of the VMM and a time of the operation. The operation history acquisitor 15 may acquire all operation log files of a VMM and may acquire an allocation process log file.

The operation history acquisitor 15 can acquire a log file, for example, by using an API of a VMM. In this case, contents of the acquired log file depend on the API.

In the embodiment, the allocating time estimator 13 estimates an allocating time by analyzing the operation history log file acquired by the operation history acquisitor 15. A method for estimating an allocating time is determined in accordance with the contents of the log file.

For example, in the case where the operation history acquisitor 15 acquires an allocation process log file, the allocating time estimator 13 may acquire each allocation processing time as an allocating time by referring to the log file.

In addition, in the case where the operation history acquisitor 15 acquires all operation log files of a VMM, the allocating time estimator 13 may extract an allocation process time and acquire the extracted time as an allocating time. The operation history acquisitor 15 can extract an allocation process time, for example, by searching a line including a specific character string from a log file. Examples of the specific character string include, but are not limited to, a name of a program factor for performing an allocation process by a VMM.

As described above, the resource allocation apparatus according to the embodiment acquires an allocating time based on the operation history of a VMM. Therefore, the resource allocation apparatus can acquire the allocating time without measuring application performance.

Fourth Embodiment

A resource control apparatus, method, and program according to a fourth embodiment will be described with reference to FIG. 12. The resource control apparatus according to the embodiment calculates an allocation amount by assuming the case where an allocating time cannot be acquired for some reason (for example, a case where an application on a VM cannot be controlled, a case where application performance cannot be measured, or a case where operation history of a VMM cannot be acquired) and assuming the case where a time lag between an allocating time and a setting time become maximum. The resource control apparatus according to the embodiment may be configured as any of the above-described embodiments.

Hereinafter, a method for calculating an allocation amount in the embodiment will be described with reference to FIG. 12. FIG. 12 is a graph describing a method for calculating an allocation amount.

Figure 12:
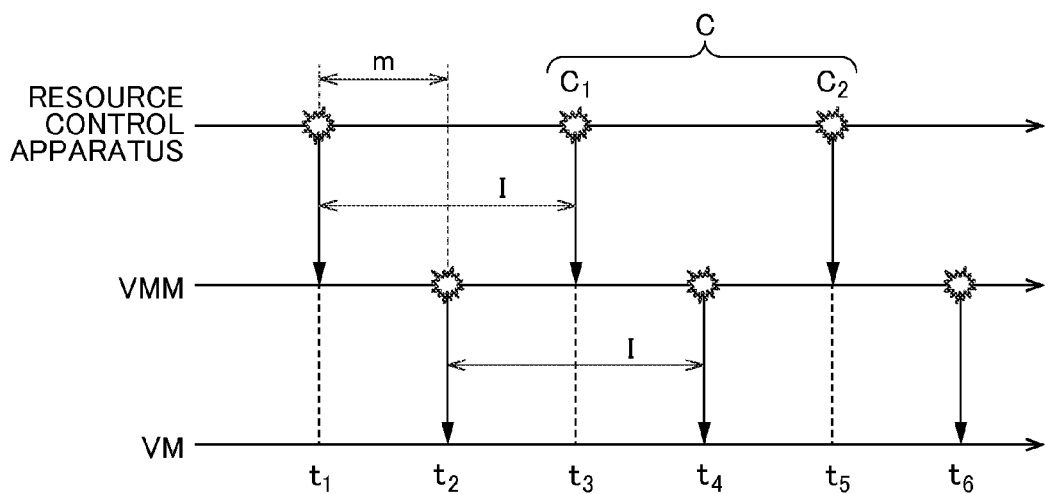
FIG. 12 is a diagram describing a method for calculating an allocation amount by a resource control apparatus according to a fourth embodiment.

In the embodiment, in the case where an allocating time cannot be acquired, the allocation amount setter 4 sets the allocation amount at the allocation interval I as illustrated in FIG. 12. A setting time can be arbitrarily set. In addition, the usage amount meter 2 measures a resource usage amount at the setting time, and the allocation amount calculator 3 calculates the allocation amount based on the usage amount calculated at the setting time. The allocation interval I may be already known and may be estimated by the allocation interval estimator 14.

At this time, a time lag m between a setting time and an allocating time of an allocation amount becomes M≤m<I+ M. This is because an allocation process by a VMM cannot be performed in time in the case of m<M. For example, in the case of m<M, the allocation amount set at the setting time $t_1$ illustrated in FIG. 12 is allocated to a VM at the allocating time included from a time $t_1$+M to a time $t_2$+M.

In the case where the allocation amount calculator 3 calculates the allocation amount as with the above-described embodiments, a resource of a VM might be in short during a time lag as described with reference to FIG. 8. Therefore, the allocation amount calculator 3 calculates a prediction value $C_1$ of a usage amount at a setting time based on usage amounts which have been measured in the past, and also calculates a prediction value $C_2$ of a usage amount at a subsequent setting time, and then calculates an allocation amount based on the prediction values $C_1$ and $C_2$.

For example, when calculating an allocation amount to be set at a setting time $t_3$, the allocation amount calculator 3 calculates the prediction value $C_1$ of the usage amount at a setting time $t_3$ based on the usage amount which has been measured by the setting time $t_1$ and also calculates the prediction value $C_2$ of the usage amount at a subsequent setting time $t_5$. Each of the prediction values $C_1$ and $C_2$ can be calculated from such as a moving average of the usage amounts which have been measured in the past.

The allocation amount calculator 3 calculates a prediction value C of the setting time $t_3$ based on the prediction values $C_1$ and $C_2$. The prediction value C is, for example, an average value and a maximum value of the prediction values $C_1$ and $C_2$. The allocation amount calculator 3 calculates the prediction value C and a value adding a predetermined margin to the prediction value C as an allocation amount at the setting time $t_3$.

As described above, the resource control apparatus according to the embodiment calculates an allocation amount to be set at a setting time based on the prediction value $C_1$ of a resource at the setting time and the prediction value $C_2$ of a resource usage amount of at a subsequent setting time. Thus, the resource control apparatus can calculate an allocation amount considering the prediction value $C_2$ of the usage amount in the case where a time lag between a setting time and an allocating time becomes maximum. Therefore, the resource control apparatus can prevent resource shortage in the case where an allocating time cannot be acquired, and precisely assure a resource.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A resource control apparatus, comprising:
a memory; and
processing circuitry configured to:
receive information on performance or operation of a virtual machine, which is operating, and acquire, based on the received information, an allocating time at which a virtual machine monitor allocates a resource allocation amount to the virtual machine;
receive information on resource usage of the virtual machine from the virtual machine or the virtual machine monitor and measure, based on the received information on the resource usage, a resource usage amount of the virtual machine at the allocating time;
calculate the resource allocation amount based on the resource usage amount; and
set the resource allocation amount to the virtual machine monitor at a setting time which is a predetermined time before a subsequent allocating time to suppress resource shortage during a time slot beginning at the subsequent allocating time,
wherein the processing circuitry is further configured to measure application performance of an application which operates on the virtual machine by increasing or decreasing the resource allocation amount and estimate the allocating time based on a time at which the application performance becomes more or less than a predetermined value in response to the increase or decrease in the resource allocation amount.

2. The apparatus according to claim 1, wherein the processing circuitry is configured to control starting and stopping operation of the application.

3. The apparatus according to claim 1, wherein the processing circuitry is further configured to estimate an allocation interval which is an interval of the allocating time based on a change in the application performance in response to periodic changes in the resource allocation amount.

4. The apparatus according to claim 3, wherein the processing circuitry is further configured to change the resource allocation amount at multiple time intervals, and to estimate, as allocation intervals, time intervals in which a time from a setting time of the resource allocation amount until the application performance is changed becomes constant.

5. The apparatus according to claim 1, wherein the processing circuitry is further configured to acquire operation history of the virtual machine monitor, and to estimate the allocating time based on the operation history.

6. A resource control method, comprising:
receiving information on performance or operation of a virtual machine, which is operating, and acquiring, based on the received information, an allocating time at which a virtual machine monitor allocates a resource allocation amount to the virtual machine;
receiving information on resource usage of the virtual machine from the virtual machine or the virtual machine monitor and measuring, based on the received information on the resource usage, a resource usage amount of the virtual machine at the allocating time;
calculating the resource allocation amount based on the resource usage amount;
setting the resource allocation amount to the virtual machine monitor at a setting time which is a predetermined time before a subsequent allocating time to suppress resource shortage during a time slot beginning at the subsequent allocating time;
measuring application performance of an application which operates on the virtual machine by increasing or decreasing the resource allocation amount; and
estimating the allocating time based on a time at which the application performance becomes more or less than a predetermined value in response to the increase or decrease in the resource allocation amount.

7. A non-transitory computer readable storage medium storing a program which, when executed, causes a computer to execute operations comprising:
receiving information on performance or operation of a virtual machine, which is operating, and acquiring, based on the received information, an allocating time at which a virtual machine monitor allocates a resource allocation amount to a virtual machine;
receiving information on resource usage of the virtual machine from the virtual machine or the virtual machine monitor and measuring, based on the received information on the resource usage, a resource usage amount of the virtual machine at the allocating time;
calculating the resource allocation amount based on the resource usage amount; and
setting the resource allocation amount to the virtual machine monitor at a setting time which is a predetermined time before a subsequent allocating time to suppress resource shortage during a time slot beginning at the subsequent allocating time;
measuring application performance of an application which operates on the virtual machine by increasing or decreasing the resource allocation amount; and
estimating the allocating time based on a time at which the performance becomes more or less than a predetermined value in response to the increase or decrease in the resource allocation amount.

8. A resource control apparatus, comprising:
a memory; and
processing circuitry configured to:
based on acquiring an allocating time at which a virtual machine monitor allocates a resource allocation amount to a virtual machine, which is operating, based on information on performance or operation of the virtual machine:
receive information on resource usage of the virtual machine from the virtual machine or the virtual machine monitor and measure, based on the received information on the resource usage, a resource usage amount of the virtual machine at the allocating time;
calculate the resource allocation amount based on the resource usage amount;
based on not acquiring the allocating time, calculate the resource allocation amount based on a prediction value of the resource usage amount at a setting time which is predetermined time before a subsequent allocating time and a prediction value of the resource usage amount at a subsequent setting time; and
set the calculated resource allocation amount to the virtual machine monitor at the setting time to suppress resource shortage during a time slot beginning at the subsequent allocating time.

9. A resource control method, comprising:
based on acquiring an allocating time at which a virtual machine monitor allocates a resource allocation amount to a virtual machine, which is operating, based on information on performance or operation of the virtual machine:
receiving information on resource usage of the virtual machine from the virtual machine or the virtual machine monitor and measuring, based on the received information on the resource usage, a resource usage amount of the virtual machine at the allocating time;
calculating the resource allocation amount based on the usage amount;
based on not acquiring the allocating time, calculating the resource allocation amount based on a prediction value of the resource usage amount at a setting time which is predetermined time before a subsequent allocating time and a prediction value of the resource usage amount at a subsequent setting time; and
setting the calculated resource allocation amount to the virtual machine monitor at the setting time to suppress resource shortage during a time slot beginning at the subsequent allocating time.

10. A non-transitory computer readable storage medium storing a program which, when executed, causes a computer to execute operations comprising:
based on acquiring an allocating time at which a virtual machine monitor allocates a resource allocation amount to a virtual machine, which is operating, based on information on performance or operation of the virtual machine:
receiving information on resource usage of the virtual machine from the virtual machine or the virtual machine monitor and measuring, based on the received information on the resource usage, a resource usage amount of the virtual machine at the allocating time; and
calculating the resource allocation amount based on the resource usage amount;
based on not acquiring the allocating time, calculating the resource allocation amount based on a prediction value of the resource usage amount at a setting time which is predetermined time before a subsequent allocating time and a prediction value of the resource usage amount at a subsequent setting time;
setting the calculated resource allocation amount to the virtual machine monitor at the setting time to suppress resource shortage during a time slot beginning at the subsequent allocating time.

* * * * *